United States Patent [19]

Feldman et al.

[11] 4,009,960

[45] Mar. 1, 1977

[54] PASSIVE OPTICAL RANGEFINDER

[75] Inventors: Sidney Feldman, Silver Spring, Md.; George G. Barton, Jr., Harkers Island, N.C.

[73] Assignee: United States of America as represented by the Secretary of the Navy, Washington, D.C.

[22] Filed: Feb. 12, 1975

[21] Appl. No.: 549,422

[52] U.S. Cl. .......................... 356/1; 178/DIG. 36; 356/4; 356/146
[51] Int. Cl.² ........................................ G01C 3/00
[58] Field of Search .............. 356/1, 4, 5, 141, 152, 356/144, 146, 247, 253, 254, 255; 178/DIG. 36

[56] References Cited

UNITED STATES PATENTS

| | | | |
|---|---|---|---|
| 3,227,033 | 1/1966 | Whyte | 356/4 |
| 3,781,467 | 12/1973 | Soames | 178/DIG. 36 |
| 3,895,870 | 7/1975 | Cullen et al. | 356/1 |

Primary Examiner—Malcolm F. Hubler
Assistant Examiner—S. C. Buczinski
Attorney, Agent, or Firm—R. S. Sciascia; A. L. Branning; R. E. Bushnell

[57] ABSTRACT

The present invention provides within a ship, a passive electro-optic device for providing a measurement of the range, together with a positively identifiable image of an approaching ship or object day or night on a CRT, with the range displayed digitally on the CRT. The rangefinder capability provides a substitute or supplement to radar or active-gated laser beam rangefinders for collision avoidance and station-keeping.

8 Claims, 5 Drawing Figures

PASSIVE OPTICAL RANGEFINDER

BACKGROUND OF THE INVENTION

The present invention relates generally to rangefinder systems and more particularly to passive optical rangefinder systems.

Frequently, both in commercial and in military situations, it is necessary to determine both the identity and location of an unknown object. The most common method to determine an object's location has been to use radar. The advantage of radar systems is that various other parameters of the object can be determined with great accuracy, such as, its speed and direction. The primary disadvantage, however, with such systems is that they have poor resolution rendering identification of the unknown object virtually impossible. Therefore, objects which can be located very closely with regard to position and speed normally cannot be otherwise identified since they appear to the radar viewer as no more than a blip or several blips on the face of a cathode ray tube. However, some advances have been made in radar technology. Complex and expensive monopulse radar systems have been developed which depend on extremely high frequency signals and intricate processing equipment to reconstruct radar images of the object to be identified.

Active optical rangefinding systems on the other hand make it quite easy to identify unknown objects but require great skill to obtain correct range information. In addition, expensive mechanical devices are needed to move the optics with precision sufficient to determine range.

Other active optical rangefinder systems have been developed which make use of gated laser beams, such as gated gallium arsenide lasers, in combination with a gated low level television camera to provide simultaneous range and optical image information. However, these systems require liquid nitrogen cooling to 77° K with refills of liquid nitrogen about every 10 hours which is expensive and inconvenient to operate. In addition, these systems are somewhat less effective during the day when bright background skies limit the sensitivity and therefore the range of the system.

SUMMARY OF THE INVENTION

The present system overcomes the disadvantages and limitations of the prior art by providing a passive optical rangefinder system. The system makes use of optics similar to a standard optical rangefinder configuration, but fixes both mirrors or prisms on infinity. This creates a double image of the unknown object which is detected by a low level light television (LLLTV) camera. The signal from the LLLTV camera is processed such that only the vertical portions of the image are left. The electronic signal is then time scanned horizontally to determine the spacing of the images, their spacing being inversely proportional to their distance from the rangefinder.

It is therefore the object of the present invention to provide an improved rangefinder.

It is also an object of the present invention to provide a rangefinder which supplies range and image information about an unknown object.

Another object of the invention is to provide a rangefinder which supplies image information of an unknown object along with its range and which is inexpensive and convenient to operate.

Another object of the present invention is to provide a rangefinder which supplies image as well as range information of an unknown object in an efficient manner during both day and night conditions of luminance.

Another object of the present invention is to provide a rangefinder which supplies both image and range information to a remote location.

Yet another object of the present invention is to provide a passive electro-optical device for supplying information about the range and image of a distance object to a remote display.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
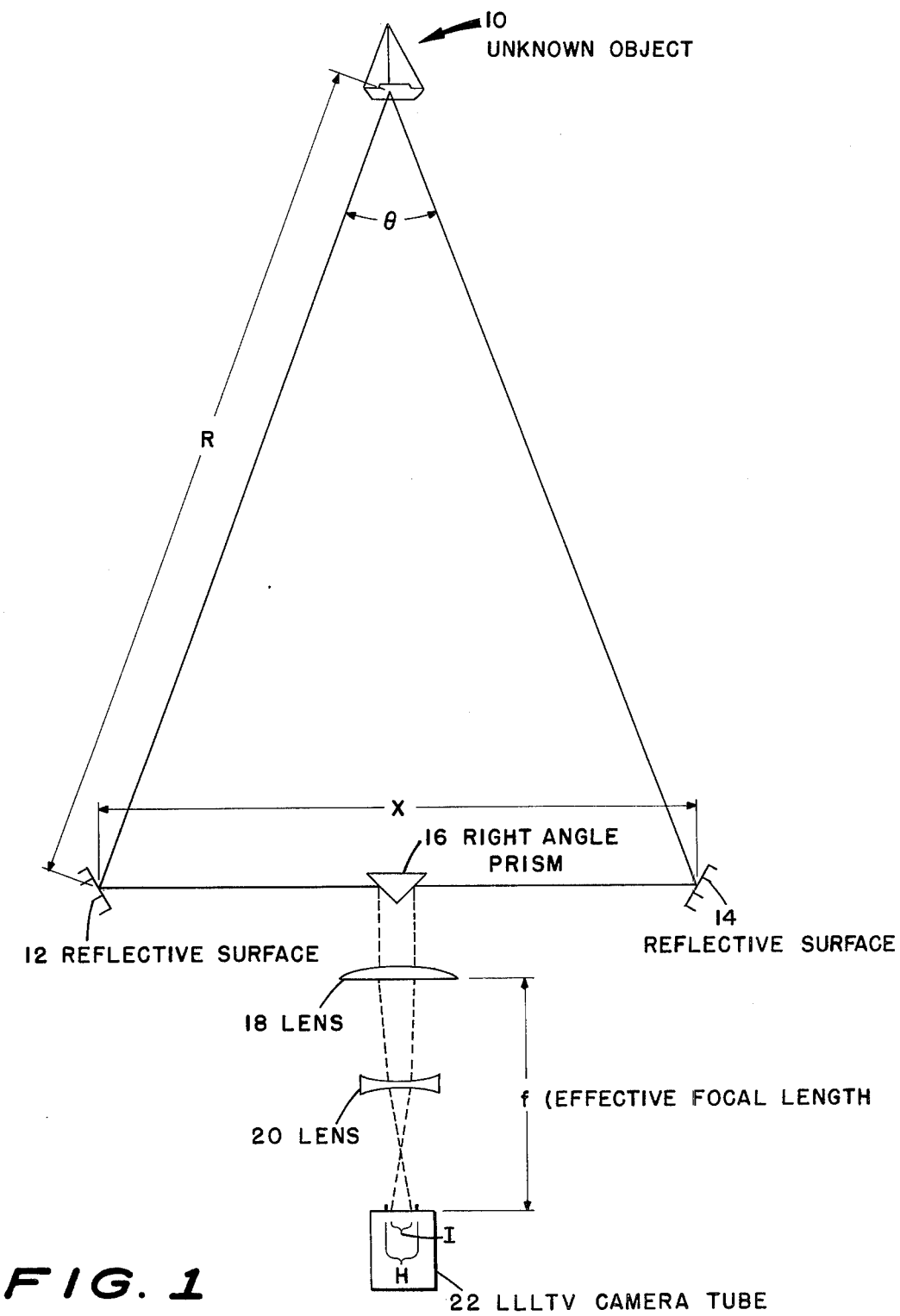
FIG. 1 discloses the optical portion of one embodiment of the present invention.

FIG. 1 shows the optical portion of the preferred embodiment for supplying range and image information of an unknown object 10 located at a distance R from the rangefinder. The image of object 10 is reflected by reflective surfaces 12 and 14 which are fixed at an infinite range and located at a distance X from each other. Light from the object 10 thus forms an angle $\theta$ from the object 10 to each of the reflective surfaces 12 and 14. Right angle prism 16 reflects light from reflective surfaces 12 and 14 through imaging lenses 18 and 20 to the LLLTV camera tube 22. The image displacement is indicated by a distance I while the photosurface size of the camera is indicated by a distance H. From a purely geometrical standpoint, it is clear that;

$$\theta \text{ rad.} = \frac{X}{R} \text{ when } R >> X. \qquad (1)$$

From the optics shown in FIG. 1;

$$\theta \text{ rad.} = \frac{I}{f} \qquad (2)$$

where $f$ = the effective focal length of the objective lens.

Thus $$\frac{X}{R} = \frac{I}{f} \qquad (3)$$

and $$R = \frac{Xf}{I} \qquad (4)$$

Since $Xf$ is set for the device, it can be considered a constant, and as the face of camera tube 22 is located past the focal point the range R is thus inversely proportional to the image displacement (distance between dual images of the object) on the LLLTV camera tube 22. The image displacement I can be calculated by the time T it takes LLLTV camera 22 to scan across I. By simple proportions, if it takes 50μ sec to scan across the distance H, then;

$$\frac{I \text{ (dist.)}}{H \text{ (dist.)}} = \frac{T \text{ (time to scan across } I)}{50 \, \mu \text{ sec.}} \quad (5)$$

and $$I = \frac{HT}{50 \, \mu \text{ sec}} \quad (6)$$

inserting equation (6) into equation (4);

$$R = \frac{Xf}{HT} \, 50 \, \mu \text{ sec.}$$

Thus by knowing T (the time it takes to scan across I) the distance R can be found since $x$, $f$, and H are all fixed for the device.

Figure 2:
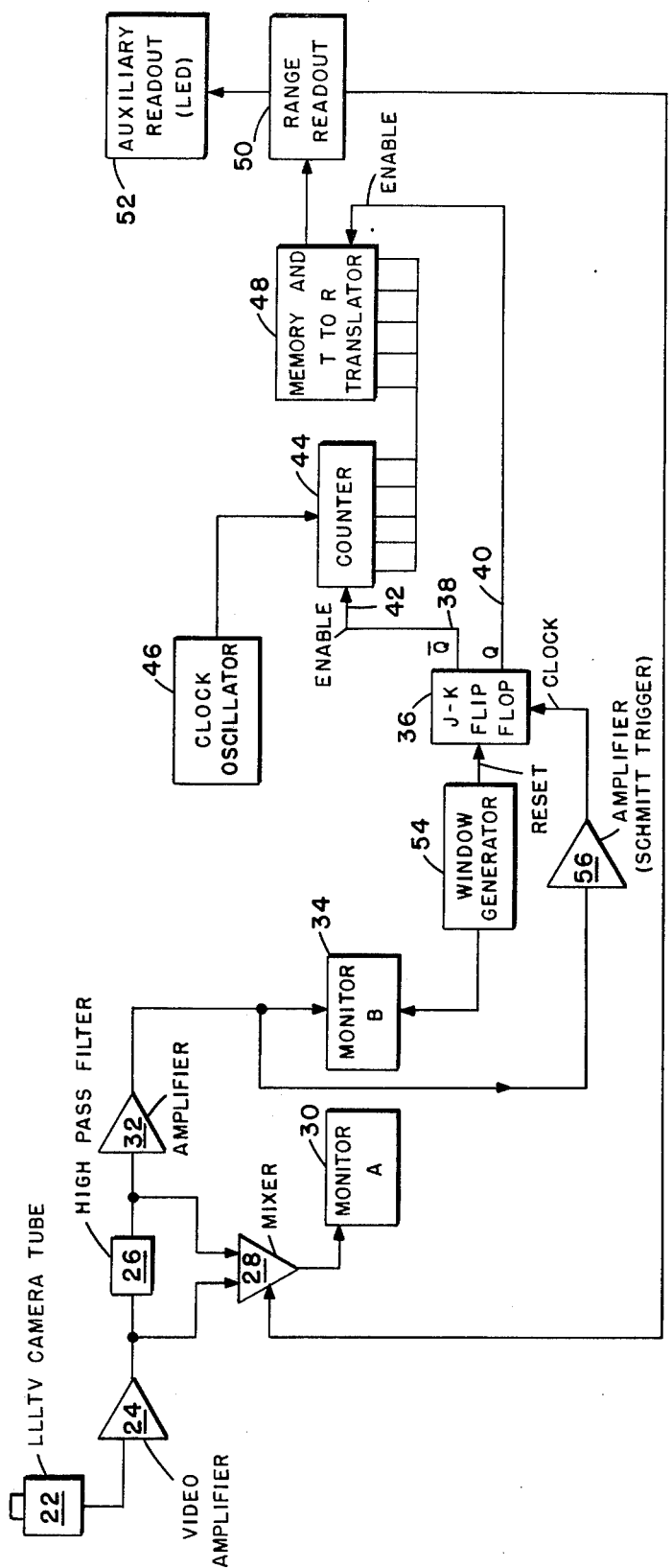
FIG. 2 discloses the electronic time scanner portion of one embodiment of the present invention.

FIG. 2 discloses the apparatus for determining T and therefore the range R. The dual image of object 10 formed by the reflective surfaces 12, 14 spaced at a distance X is detected by LLLTV camera 22 to form a video signal representative thereof. That signal is amplified by video amplifier 24 and passed through high pass filter 26. Both the filtered and unfiltered video signal are combined in mixer 28 to enhance the resolution of the display on monitor A30. The filtered signal is amplified in amplifier 32 for display on monitor B34.

Figure 3:
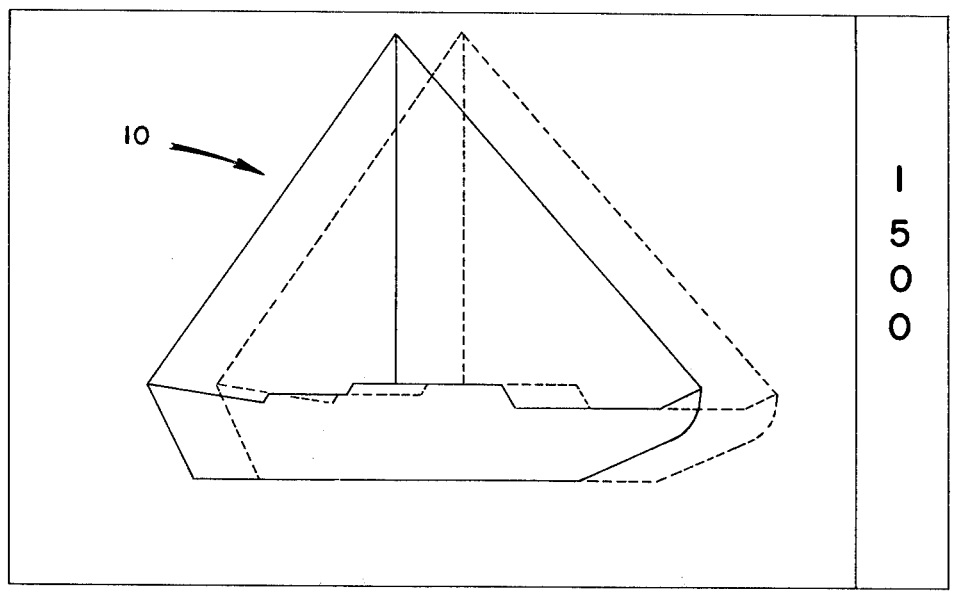
FIG. 3 illustrates typical information produced on monitor A.
Figure 4:
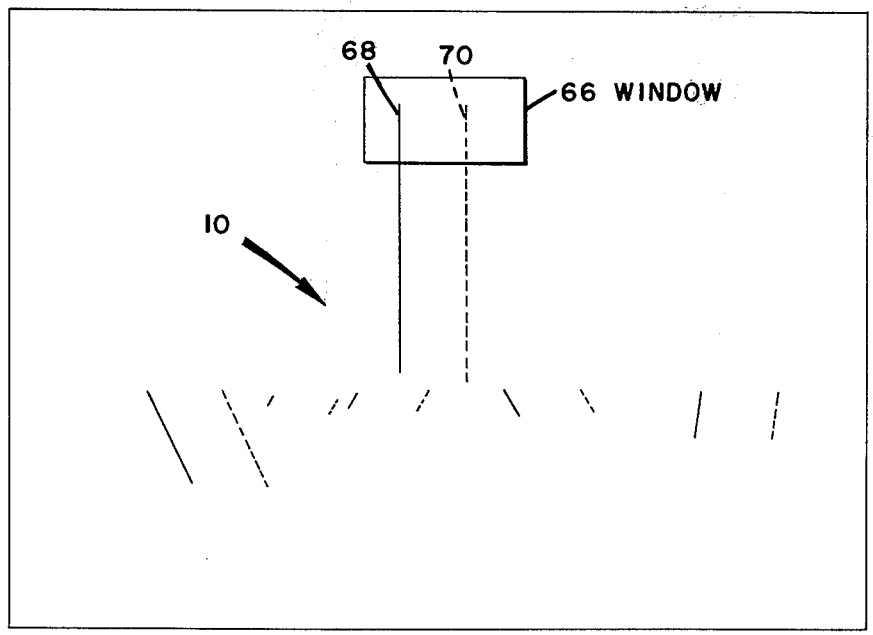
FIG. 4 illustrates typical information produced on monitor B.

FIGS. 3 and 4 show displays of monitors A and B, 30, 34 respectively. The unknown object 10 appears on the monitor A30, as a dual image as shown in FIG. 3, one image represented as a solid line and the other as a dotted line. The range information is displayed in digital form at the right side of monitor A as shown in FIG. 3. Monitor B34, as shown in FIG. 4 displays only the data passed through high pass filter 26 so that only the vertical sections 68, 70 of the image remain to better enable the device to measure the image displacement. Turning back to FIG. 2, the manner in which the device performs these functions is disclosed.

A window generator 54, shown in FIG. 2, is an operator controlled device for selecting a window 66 on the display of monitor 34 as shown in FIG. 4. This window 66 precludes all but the two best vertical edges 68, 70 for timing measurement. The window information is coupled to the J-K flip flop 36 for the generation of a reset signal. The reset pulse from the window generator enables the J-K flip flop 36 only for scans across monitor B which fall within the window area 66. Upon receipt of the first input image edge 68 from amplifier 56, the J-K flip flop 36 changes state and activates the timing counter 44 via output $\overline{Q}$ 38 from the J-K flip flop and enable input 42 of the counter 44. The counter then accumulates counts from clock oscillator 46. Upon receipt of the second image edge 70 from amplifier 56 the J-K flip flop 36 is reset and the counter 44 is disabled. The accumulated count is transferred to a memory and time to range translator 48 which is enabled by output 40 of J-K flip flop 36. Translator 48 in turn drives the range readout 50 and auxiliary readouts 52. The range data is fed back to monitor A for display via mixer 28.

Figure 5:
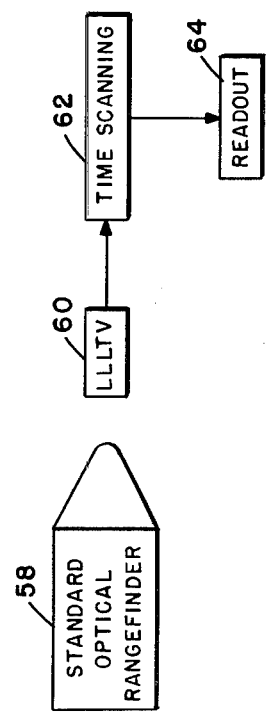
FIG. 5 discloses an alternative embodiment.

FIG. 5 discloses an alternative embodiment of the present invention wherein a LLLTV 60 is used in conjunction with a standard optical rangefinder 58. A time scanning mechanism 62 such as the one shown in FIG. 2 is connected to the LLLTV 60 for determining the distance between images and therefore the range. The electronic time scanning and readout system can be calibrated to known distances for any particular setting of the standard optical range finder 58.

The present invention therefore provides positively identifiable images of nearby ships or objects along with range information about the object on a CRT monitor with the ship. The system is simple, inexpensive, and permits more effective range measurements during daylight than active optical laser rangefinders.

Obviously many modifications and variations of the present invention are possible in light of the above teachings. For example, any suitable camera tube, LLLTV or standard day camera, including an image converter tube (i.e., a tube having a far infrared or ultra-violet image input), can be used with the device if properly sensitive to the light from the optics of the device. In addition, reflective or refractive optics as well as prisms for mirrors or vice versa can be used in the optical portion of the device. It is therefore to be understood that within the scope of the appended claims the invention may be practiced otherwise than as specifically described.

What is claimed as new and desired to be secured by Letters Patent of the United States is:

1. A passive optical rangefinder for supplying both image and range information in digital form on a remotely located monitor, comprising:
    optical means for producing a dual image of an object located at a distance from said rangefinder wherein images of said dual image are spaced by an amount proportional to said distance;
    means for transforming said dual image into an electrical signal representative thereof;
    control means including means for eliminating all components of said electrical signal but those components representating pairs of parallel features of said dual image having a preferred orientation, means for displaying the pairs of parallel features by scanning a display surface, means for selecting from the display surface a field-of-view containing a pair of said parallel features, and means for producing a control signal varying in proportion to the spacing between said pair of parallel features;
    means controlled by said control signal for producing a signal representative of said spacing of said pair of parallel features and said range.

2. The optical rangefinder of claim 1 wherein said control means comprises:
    a high pass filter;
    a monitor coupled to said high pass filter;
    a window generator connected to said monitor;
    a flip flop having its input connected to said monitor and its reset terminal coupled to said window generator, whereby the flip flop is activated by said electrical signal to provide said control signal for enabling and disenabling said means controlled by said control signal.

3. The optical rangefinder of claim 1 wherein said means controlled by said control signal comprises;

a counter;

a clock oscillator connected to said counter;

a memory and translator connected to said counter.

4. The optical rangefinder of claim 2 wherein said means controlled by said control signal comprises:

a counter;

a clock oscillator connected to said counter;

a memory and translator connected to said counter.

5. A passive optic device for determining the range of a distant object, comprising:

a plurality of optic means providing a pair of images with at least transverse separation proportional to the range of said object;

optoelectric means for producing in dependence upon detection of said images a representative video signal;

a high pass electrical filter coupled in series with said optoelectric means and providing a filtered video signal representative of parallel features of said images having a selected orientation;

a monitor providing a visual display scanned perpendicularly to said parallel features in response to reception of said filtered video signal;

an operator controllable generator adapted to allow electronic selection of a field upon said visual display for providing a reset signal during scanning of the field by said monitor;

a logic trigger electrically coupled to said high pass filter for generating a clock pulse in response to reception of each characteristic of said filtered video signal representative of said parallel features;

a bistable logic device electrically coupled to said generator and said trigger for providing a first enabling signal spanning the interval between reception of successive pairs of said clock pulses during reception of said reset pulse and providing a second enabling signal upon termination of the first enabling signal;

a timer electrically coupled to said bistable logic device for providing a time signal indicative of the duration of the last occurring said first enabling signal; and a translator circuit adapted to receive said time signal for providing in response to reception of said second enabling signal a numeric display inversely proportional in value to the magnitude of said time signal;

wherein said numeric display is indicative of the range of said distant object.

6. A passive optic device as set forth in claim 5 for determining the range of a distant object that produces no visual change in light intensity against its background wherein said optoelectric means comprises a camera tube.

7. A passive optic device as set forth in claim 6 wherein said camera tube comprises an image converter tube.

8. A passive optic device as set forth in claim 5 wherein said parallel features have a vertical orientation.

* * * * *